(12) United States Patent
Greenwood et al.

(10) Patent No.: US 8,925,439 B2
(45) Date of Patent: Jan. 6, 2015

(54) VALVE CONTROL VALVE CIRCUIT FOR OPERATING A SINGLE ACTING HYDRAULIC CYLINDER

(75) Inventors: Jason Greenwood, Milwaukee, WI (US); Matthew J. Rades, Oconomowoc, WI (US); David J. Schedgick, Menasha, WI (US)

(73) Assignee: HUSCO International, Inc., Waukesha, WI (US)

( * ) Notice: Subject to any disclaimer, the term of this patent is extended or adjusted under 35 U.S.C. 154(b) by 1030 days.

(21) Appl. No.: 13/006,123

(22) Filed: Jan. 13, 2011

(65) Prior Publication Data

US 2012/0180878 A1  Jul. 19, 2012

(51) Int. Cl.
  *F15B 11/04* (2006.01)
  *A01B 63/10* (2006.01)
  *F15B 11/08* (2006.01)

(52) U.S. Cl.
  CPC ............ *A01B 63/1006* (2013.01); *F15B 11/08* (2013.01); *F15B 2211/30505* (2013.01); *F15B 2211/329* (2013.01); *F15B 2211/41563* (2013.01); *F15B 2211/45* (2013.01); *F15B 2211/50518* (2013.01); *F15B 2211/7052* (2013.01); *F15B 2211/7128* (2013.01)
  USPC .............................................. 91/445; 91/516

(58) Field of Classification Search
  CPC ................. F15B 11/003; F15B 11/055; F15B 2013/0413; F15B 2211/652
  USPC ....................................... 60/468; 91/445, 516
  See application file for complete search history.

(56) References Cited

U.S. PATENT DOCUMENTS

| | | |
|---|---|---|
| 2,964,113 A | 12/1960 | Presnell et al. |
| 3,331,447 A | 7/1967 | Simak |
| 3,470,963 A | 10/1969 | Schneider et al. |
| 3,805,678 A | 4/1974 | Bianchetta et al. |
| 3,807,175 A | 4/1974 | Kubik |
| 3,834,738 A | 9/1974 | Koch |
| 3,906,840 A | 9/1975 | Bianchetta et al. |
| 3,943,824 A | 3/1976 | Fletcher |
| 3,943,825 A | 3/1976 | Bianchetta et al. |
| 3,990,520 A | 11/1976 | Koch et al. |
| 4,000,683 A | 1/1977 | Schexnayder |
| 4,028,820 A | 6/1977 | Simonds, Jr. |
| 4,057,109 A | 11/1977 | Nelson |
| 4,094,228 A | 6/1978 | Schexnayder |

(Continued)

FOREIGN PATENT DOCUMENTS

| | | |
|---|---|---|
| DE | 102006038801 A1 | 2/2008 |
| JP | 2004350514 A | 12/2004 |

*Primary Examiner* — F. Daniel Lopez
(74) *Attorney, Agent, or Firm* — Quarles & Brady LLP

(57) ABSTRACT

A system for operating a single acting hydraulic cylinder includes a directional valve that has one extreme position in which a workport is connected to a tank return conduit, another extreme position where the workport is connected to a pump supply conduit, and a closed intermediate a position where the workport is disconnected from both the pump and the tank. The directional valve is pilot operated and is biased toward the one extreme position by a spring. An electrically operated primary applies pilot pressure to the directional valve alternately from the pump supply conduit and the tank return conduit. A pilot operated check valve has a first state which restricts fluid flow only from the workport toward the chamber and a second state in which fluid can flows from the chamber to the workport. The system has a pressure compensation that also provides self priming of the directional valve.

20 Claims, 3 Drawing Sheets

(56) References Cited

U.S. PATENT DOCUMENTS

| | | | | |
|---|---|---|---|---|
| 4,102,250 | A | 7/1978 | Schexnayder | |
| 4,111,283 | A | 9/1978 | Hastings, Jr. | |
| 4,139,063 | A | 2/1979 | Adams | |
| 4,166,506 | A | 9/1979 | Tezuka et al. | |
| 4,286,502 | A | 9/1981 | Bianchetta et al. | |
| 4,329,911 | A | 5/1982 | Schwerin | |
| 4,355,565 | A | 10/1982 | Bianchetta | |
| 4,406,597 | A | 9/1983 | Stanton | |
| 4,438,818 | A | 3/1984 | Treichel et al. | |
| 4,456,060 | A | 6/1984 | Stanton | |
| 4,557,180 | A | 12/1985 | Glomeau | |
| 4,646,620 | A | 3/1987 | Buchl | |
| 4,977,928 | A * | 12/1990 | Smith et al. | 91/516 |
| 5,014,824 | A | 5/1991 | Fargo | |
| 5,046,310 | A * | 9/1991 | Kauss | 91/445 |
| 5,048,395 | A * | 9/1991 | Ohshima | 91/445 |
| 5,082,091 | A | 1/1992 | Fargo | |
| 5,088,283 | A * | 2/1992 | Bosniac | 60/468 |
| 5,186,000 | A | 2/1993 | Hirata et al. | |
| 5,331,882 | A | 7/1994 | Miller | |
| 6,282,893 | B1 | 9/2001 | Porter et al. | |
| 6,467,553 | B1 | 10/2002 | Wojanis | |
| 6,516,706 | B2 | 2/2003 | Porter et al. | |
| 6,526,747 | B2 | 3/2003 | Nakatani et al. | |
| 6,899,012 | B2 | 5/2005 | Pili et al. | |
| 7,328,646 | B2 * | 2/2008 | Jensen et al. | 91/447 |
| 7,409,825 | B2 | 8/2008 | Stephenson | |
| 7,448,208 | B2 | 11/2008 | Montineri | |
| 7,487,707 | B2 | 2/2009 | Pfaff et al. | |
| 7,665,579 | B2 | 2/2010 | Itose | |
| 2007/0045067 | A1 | 3/2007 | Schedgick et al. | |

* cited by examiner

VALVE CONTROL VALVE CIRCUIT FOR OPERATING A SINGLE ACTING HYDRAULIC CYLINDER

CROSS-REFERENCE TO RELATED APPLICATIONS

Not Applicable

Statement Regarding Federally Sponsored Research or Development

Not Applicable

BACKGROUND OF THE INVENTION

1. Field of the Invention

The present invention relates to hydraulic systems that have a single acting hydraulic cylinder, and more particularly to an arrangement of valves for controlling operation of such a hydraulic cylinder.

2. Description of the Related Art

A variety of agricultural implements are available to be pulled by a tractor for working earth in a field in which crops will be or have been planted. The implement is connected to a standard three-point hitch on the rear of the tractor and the hitch can be hydraulically operated to raise and lower the implement.

In order to raise or lower the tractor hitch, the operator manipulates a human interface in a manner that indicates the direction and speed at which the hitch is desired to be moved. The human interface sends an electrical signal to a controller that then applies an electric current to a solenoid operated directional control valve. That directional control valve either sends pressurized fluid to one or more single-acting cylinders to raise the hitch or drains fluid from the hydraulic cylinders to lower the hitch.

The directional control valve often is a three-position spool valve in which a closed, or center, position is between the two positions that provide the raised and lower states of the valve. It is desirable that a closed position be in between the two active positions so that an abrupt reversal of hydraulic operation does not occur, as would happen if the raise position was immediately adjacent the lower position. The directional control valve often is a spool valve with a pair solenoids acting on opposite ends of the spool. Activating one of the solenoids moves the control valve in one direction to raise the hitch and energizing the other solenoid moves the spool in the opposite direction to lower the hitch. Springs at those opposite ends center the spool into the closed position when both solenoids are de-energized.

Such dual solenoid, spool valves are commonly used in hydraulic systems for a wide variety of machines. Although spool valves are acceptable in a many applications, there is a certain amount of leakage through the valve in the closed position. That leakage is of little concern in most applications because the valve is operated so frequently that it does not remain in the closed position long enough for a significant amount of total leakage to occur that adversely affects operation of the machine.

That, however, is not necessarily the case with respect to a spool-type directional control valve used to position the hitch of an agricultural tractor. When the tractor commences to work an agricultural field, the hitch positions the implement at a desired depth in the soil. The tractor may then be operated for a significant amount of time in that position of the implement. For example, if the implement is a plow, the hitch may remain in the same position while a field of many acres is being plowed. During that length of time, the total leakage occurring in the spool-type valve can be great enough to produce a significant deviation in the position of the implement. The vehicle can be parked for a significant period of time, during which the hitch is in an extended condition with an implement raised. At such times, the hydraulic system is not active to provide pressurized fluid to maintain the hitch and implement in the raised position. As a result, a load holding technique must be provided to prevent the hitch from lowering under the hydraulic load.

Therefore, there is a desire to provide a hydraulic system has minimal leakage when the hitch remains in a single working position for a prolonged period of time. It further is desirable to control the directional spool valve with a single solenoid to reduce complexity of that device.

SUMMARY OF THE INVENTION

A system selectively controls flow of fluid between a single-acting hydraulic cylinder and each of a pump and a tank. That control is accomplished by a directional control valve with a workport. The directional control valve has a first position in which the workport is connected to the pump, a second position in which the workport is disconnected from both the pump and the tank, and a third position in which the workport is connected to the tank. The second position is between the first and third positions. The directional control valve is biased into the third position by a spring and is pilot operated to move from that third position by pressure applied to a pilot port.

An electrically operated primary pilot valve selectively connects the pilot port of the directional control valve alternately to an outlet of the pump and to the tank.

A selective check valve is operably connected to control fluid flow between the workport and the hydraulic cylinder. This valve has a first state in which fluid can flow only from the workport toward the hydraulic cylinder and a second state in which fluid can flow from the hydraulic cylinder to the workport. The selective check valve is operated by a control signal, either a pilot pressure or an electrical signal applied to the control port.

Another embodiment of the control system employs a directional control valve with a fourth position in which the workport is disconnected from both the pump and the tank. This directional control valve is normally biased into the fourth position.

Another aspect of the system includes a pressure compensator that controls pressure in the conduit from the pump to the directional control valve in a manner that provides a relatively constant pressure drop across that valve. In one version that pressure compensator also self primes the directional control valve.

DETAILED DESCRIPTION OF THE INVENTION

Definitions

Figure 1:
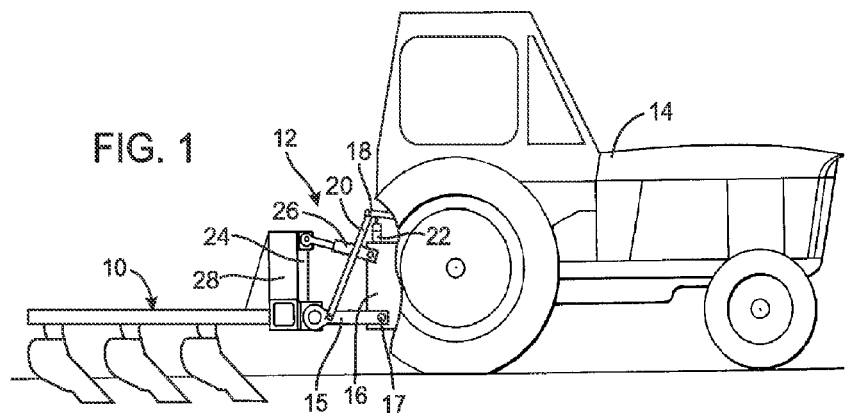
FIG. 1 illustrates a tractor to which an agricultural implement is attached by a conventional three-point hitch.

The term "directly connected" means that the associated components are connected together by a conduit without any intervening element, such as a valve, an orifice or other device, which restricts or controls the flow of fluid beyond the inherent restriction of any conduit.

As used herein, the term "hydraulic cylinder" generically refers to a hydraulic actuator that comprises a cylinder body in which a piston moves in response to hydraulic fluid being fed into and drained from the cylinder body and in which a rod is connected to the piston so as the extend from and retract into the cylinder as the piston moves.

The term "selective check valve" refers to a valve that has two selectable states, one state in which fluid can flow in only one direction through the valve and another state which allows free flow in the opposite direction. The selective check valve may comprise a pilot operated check valve or a two state electrohydraulic valve, for example.

Reference herein to directional relationships and movement, such as raise and lower or left and right, refer to the relationship and movement of components in the orientation illustrated in the drawings and on the exemplary application of the invention being described, and other relationships and orientations of the components may exist in other applications of the present invention.

Embodiments of the Invention

Although the inventive concepts are being described in the context of a hydraulic system for operating a hitch on an agricultural tractor, those concepts have broad applicability to controlling a single acting hydraulic cylinder on other types of machines.

With initial reference to FIG. 1, an implement 10, such as an agricultural plow, is connected by a three-point hitch 12 at the rear of a tractor 14. The hitch 12 comprises right and left drag links 15 (only one of which is visible in the drawings), each having a proximal end pivotally attached to the tractor frame 16 by separate pins 17. Each drag link 15 is connected to a different lift arm 18 by a separate lift link 20. Individual single acting, hydraulic cylinders 22 are connected between the lift arms 18 and the tractor frame 16 to pivot the lift arms in unison, thereby altering the elevation of the drag links. The distal ends of the drag links 15 are attached to a hitch coupler 24 that also is attached by a pivoting link member 26 to the tractor frame 16. The hitch coupler 24 has a set of hooks that engage pins on a mating coupling 28 on the implement 10. Operating the hydraulic cylinders 22 pivots the lift arms up and down with respect to that frame 16, thereby raising and lowering the hitch coupler 24 and the implement attached thereto. It should be appreciated that the present control system can be used to operate a single hydraulic cylinder or more that two hydraulic cylinders in unison.

Figure 2:
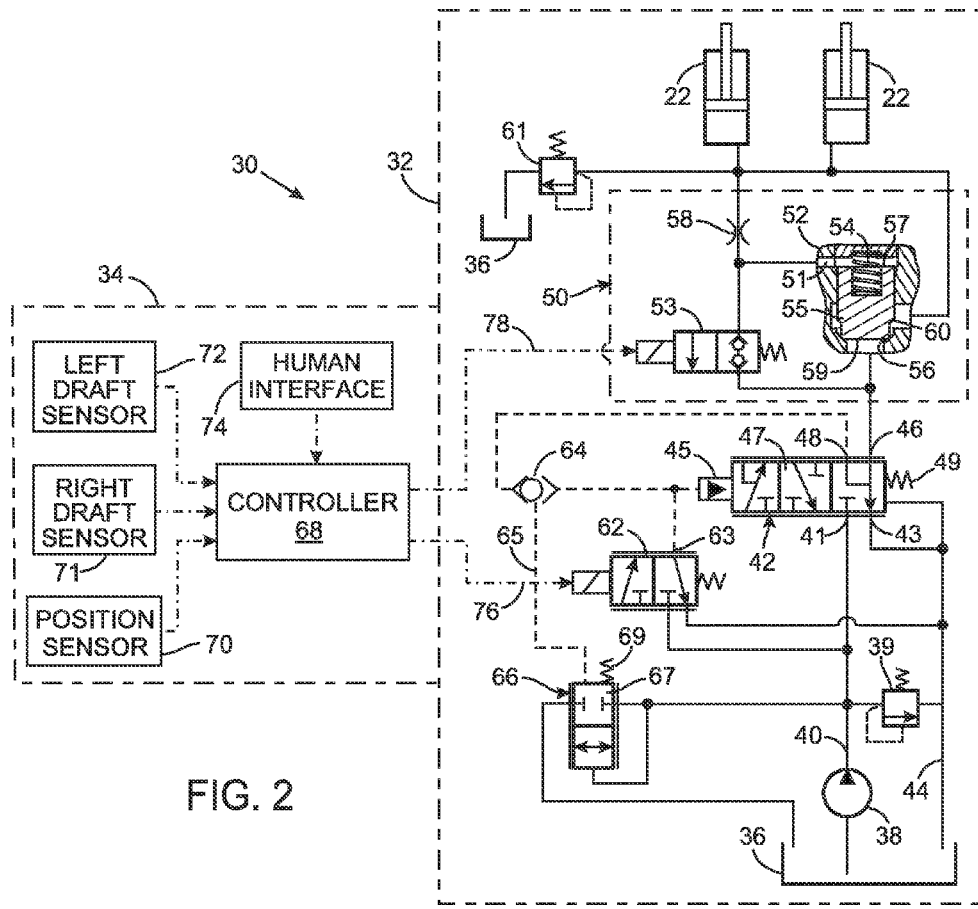
FIG. 2 depicts a control system with a first hydraulic section controlled by an electronics section for operating the three-point hitch.

With reference to FIG. 2, the three-point hitch 12 is operated by a control system 30 that has a first hydraulic section 32 and an electronic section 34. The hydraulic section 32 includes a tank 36 that serves as a reservoir for storing hydraulic fluid. The hydraulic fluid is drawn from the tank 36 by a pump 38 which is operated by the engine of the tractor 14 and which forces the fluid under pressure into a supply conduit 40. A primary pressure relief valve 39 is provided to relieve any excessively high pressure that occurs in the supply conduit 40. The supply conduit 40 is connected to a supply port 41 of a directional control valve 42. That valve 42 has a tank port 43 which is connected to a return conduit 44 leading back to the tank 36. The directional control valve 42 also has a workport 46 and a load sense port 48.

The directional control valve 42 is a three-position, proportional spool valve that is pilot operated by pressure applied to a pilot port 45. The center position of the directional control valve 42 is the closed condition in which the workport 46 is connected to neither the supply port 41 nor the tank port 43. In that center position, however, the load sense port 48 is connected to the tank port 43. On one side of the center position is a hitch raise position, in which the supply port 41 is connected through a variable metering orifice to both the workport 46 and the load sense port 48. On the other side of the center position is a hitch lower position, in which the workport 46 and the load sense port 48 are connected via the variable metering orifice to the tank port 43. FIG. 2 illustrates the directional control valve 42 in the hitch lower position. A spring 49 biases the spool into the hitch lower position. Pressure in the return conduit 44 is also applied to the same end of the spool as the spring 49 and also tends to move the spool into the hitch lower position.

Operation of the directional control valve 42 is controlled by a proportional primary pilot valve 62 that is electrically operated, such as by a solenoid. The primary pilot valve 62 has a first port connected to the supply conduit 40, a second port connected to the return conduit 44, and a third port 63 connected directly to the pilot port 45 of the directional control valve 42. The primary pilot valve 62 has two states, a de-energized state in which the return conduit 44 is connected to the third port 63 and an energized state in which the supply conduit 40 is connected to the third port.

The pilot port 45 of the directional control valve 42 also is connected to one input of a shuttle valve 64 that has another input connected to the load sense port 48 of the directional control valve. The shuttle valve 64 conveys the greater of the pressures at those inputs to an output that is connected via a load sense conduit 65 to a pressure compensator valve 66. The pressure compensator valve 66 is connected between the supply conduit 40 and the tank 36. When the hydraulic cylinders 22 are being raised, the pressure compensator valve 66 functions to maintain the supply conduit pressure slightly greater than the pressure in the hydraulic cylinders 22 that results from load forces. Specifically, one end of the valve element 67 of the pressure compensator valve 66 is operated on by both a spring 69 and outlet pressure from the shuttle valve 64, which biases the pressure compensator valve toward the closed position. The other end of the valve element 67 is acted on by pressure in the supply conduit 40 which biases the pressure compensator valve 66 toward the open position.

The workport 46 of the directional control valve 42 is connected by a selective check valve 50 to the head chambers of the two single acting hydraulic cylinders 22. The cylinder head chambers are also connected through a pressure relief valve 61 to the tank 36 to relieve any excessively high pressure that may occur.

The selective check valve 50 has a first state which allows fluid to flow only from the workport 46 of the directional control valve 42 to the hydraulic cylinders 22. In a second state, the selective check valve 50 permits fluid to flow from the hydraulic cylinders 22 to the workport 46. In the embodiment in FIG. 2, the selective check valve 50 is a pilot valve assembly that comprises a low leakage, poppet check valve 52 operated by a secondary pilot valve 53. A spring 54 biases a poppet 55, that forms a valve element of the poppet check valve 52, into the position in which the poppet engages the valve seat 56 to close the check valve. The state of the selective check valve 50 is controlled by pressures applied to opposite ends of the poppet 55. Pressure from the head chambers of the hydraulic cylinders 22 is applied through a fixed orifice 58 to a control port 51 from which that pressure is exerted on a first poppet end 57 remote from the valve seat 56. The workport pressure from the directional control valve 42 is applied to a second end 59, the poppet nose, exposed through the valve seat 56. The on/off electrohydraulic, secondary pilot valve 53 has an open state in which pressure from the workport 46 also is applied to the control port 51 of the directional control valve 42. The secondary pilot valve 53 is placed into the different states by a solenoid operator, for example.

The primary and secondary pilot valves 62 and 53 are operated by the electronic section 34. The electronic section 34 comprises a controller 68 that is a microcomputer based device which includes a memory for storing a software program that is executed to control operation of the three-point hitch 12. The controller 68 receives a signal produced in response to the operator inputting commands into a human interface 74 in the tractor cab. A position sensor 70 provides a signal to the controller 68 indicating the position of the hitch coupler 24 with respect to the tractor frame 16. For example to position sensor may detect the angular position of one of different lift arms 18 with respect to the tractor frame. Other sensors, referred to as left and right draft sensors 71 and 72, are located on the drag links 15 to detect forces that the implement exerts on the hitch as the tractor moves forward. As will be described, when the operator of the tractor 14 enters commands into the human interface 74, the controller 68 processes the resultant signal to determine the desired direction and the rate of the hitch motion. Depending on the results of that processing, the controller 68 sends one electric signal via a first conductor 76 to the solenoid of the primary pilot valve 62 and may send another electric signal via a second conductor 78 to the solenoid of the secondary pilot valve 53.

When the three-point hitch 12 is stationary, the directional control valve 42 is biased by the spring 49 into the lower position (illustrated in FIG. 2), in which the workport 46 is connected to the tank port 43 and thus to the return conduit 44. At this time, the selective check valve 50 is biased by its spring 54 into the first state in which an internal check valve prevents fluid from flowing from the hydraulic cylinders 22 to the workport 46 and thus through the directional control valve 42 to the return conduit 44. Because the selective check valve 50 is a low leakage type valve, the fluid is held within the hydraulic cylinders 22 and as a result, the three-point hitch 12 remains in the fixed position.

When it is desired to lower the three-point hitch 12, the operator of the tractor 14 operates the human interface 74 in a manner that conveys a signal to the controller 68 indicating that lowering is desired and the speed at which the lowering is to occur. The controller 68 responds to the human interface signal by first moving the spool 47 of the directional control valve 42 to a location in the lowering position, wherein the size of the metering orifice provides the requisite flow rate for the desired hitch speed. This is accomplished by opening the proportional primary pilot valve 62 by an amount that applies a pressure to the pilot port 45 of the directional control valve 42 that moves the spool 47 into the appropriate location. This positioning of the directional control valve 42 regulates the rate at which fluid will flow through the valve from the workport 46 into the return conduit 44 and thereby the rate at which the hitch 12 will be lowered. After the directional control valve 42 has been placed in the proper metering position, the selective check valve 50 is opened by the controller 68 energizing the secondary pilot valve 53 into the open state that provides a path between the control port 51 of the poppet check valve 52 and the workport 46 of the directional control valve. This applies a relatively low pressure from the return conduit 44 to both the first and second ends 57 and 59 of the poppet 55.

A greater pressure from the hydraulic cylinders 22 is applied to a surface 60 adjacent the second end 59 of the poppet 55, thereby forcing the poppet 55 away from the valve seat 56 and placing the selective check valve 50 into the second state. Note that the orifice 58 between the hydraulic cylinders 22 and the control port 51 provides a pressure drop so that the poppet's first end 57 is exposed to a lower pressure than pressure applied to surface 60 near the second end. In the second state, an open path is provided from the hydraulic cylinders to the workport 46 of the directional control valve 42. As a result, fluid drains from the hydraulic cylinders 22 through the selective check valve 50 and the directional control valve 42 into the tank 36, thereby lowering the hitch 12.

As the hitch is lowering the input settings of the human interface 74 define the rate of the descent. The controller 68 responds to those input settings by controlling the amount that the primary pilot valve 62 is opened to proportionally vary the metering orifice of the directional control valve 42 and thus the flow there through.

When it is desired to raise the hitch 12, the operator of the tractor 14 enters the appropriate command into the human interface 74, to which the controller 68 responds by operating the primary pilot valve 62 to apply pressure form a supply conduit 40 to the pilot port 45 of the directional control valve 42. That action moves the spool 47 of the directional control valve through the center, closed, position into the raising position at which the supply conduit 40 is connected to the workport 46. The precise location of the spool 47 in the raising position determines the size of the metering orifice through which the fluid flows, and as a result, the fluid flow rate and the speed of the hitch 12. Pressurized fluid now flows from the outlet of the pump 38 flows from workport 46 to the selective check valve 50, which is in the first state, illustrated in FIG. 2, in which the secondary pilot valve 53 is closed. In that first state, pressure from the hydraulic cylinders 22 is applied to the first end 57 of the poppet 55, and to the opposing surface 60, and the pressure from the workport 46 is applied to the second end 59. At this time, the workport pressure from the supply conduit 40 is greater than the hydraulic cylinder pressure thereby causing the poppet 55 to move away from the seat 56 in the selective check valve 50. This allows pressurized fluid from the workport 46 to flow into the hydraulic cylinders 22, thereby raising the three-point hitch 12.

As the hitch 12 is raising, the implement load creates a load pressure in the hydraulic cylinders 22 that is conveyed to the workport 46 of the directional control valve 42. In the raising position, the workport 46 is coupled to the load sense port 48 and thus the load pressure is applied to an input of the shuttle valve 64. The shuttle valve 64 selects the greater of that pressure at the workport and the supply conduit pressure conveyed through the primary pilot valve 62. The selected greater pressure is then applied, as a conventional load sense signal, to the pressure compensator valve 66. The load sense signal along with the spring force are applied to one end of the valve element 67 in the pressure compensator valve and the supply conduit pressure is applied to the opposite end. Fluid from the supply conduit 40 does not flow through the pressure compensator valve 66 to the tank 36 unless the supply conduit pressure is greater than the load pressure by an amount set by the force of the spring 69. Therefore, the supply conduit pressure is maintained at this amount greater than the load pressure, which results in constant pressure drop occurring across the metering orifice of the directional control valve 42.

When the signal from the position sensor 70 indicates that the three-point hitch 12 has been raised to the desired position, the controller responds by deactivating the primary pilot valve 62, which releases the pressure that had been applied to the pilot port of the directional control valve 42. This causes the spring 49 to return the directional control valve 42 to the lowering position. However, at this time the selective check valve 50 remains in the first state in which the internal check valve prevents fluid from exiting the hydraulic cylinders 22. Thus the three-point hitch 12 remains stationary in the desired position.

When the three-point hitch 12 is stationary, the hydraulic section 32 of the control system 30 is in the state illustrated in FIG. 2 in which hydraulic fluid from the pump 38 is not being consumed. In this state, both inputs to shuttle valve 64 are at a relatively low pressure, from the tank return conduit 44. When the low pressure is applied via the load sense conduit 65 to the pressure compensator valve 66, the greater pump outlet pressure that also is applied to the compensator valve causes that valve to open. This relieves the pressure at the outlet of the pump 38 to the tank 36. When the pressure in the supply conduit 40 decreases below the pressure level defined by the force of spring 69, the pressure compensator valve 66 closes. The pressure compensator valve 66 reopens as soon as the supply conduit pressure increases above the spring force level. Thus, the pressure in the supply conduit 40 is maintained at a level, e.g., 7 bar, set by the spring force.

A problem that has plagued some types of electrohydraulic valves and pilot operated valves is that a certain minimum level of pressure must be applied in order for the valve to begin operating. Thus, even though the primary pilot valve is opened to apply pressure from the supply conduit to the pilot port of the directional control valve, that latter valve will not change positions if the supply conduit pressure is too low. The present hydraulic s avoids that possibility by incorporating a self priming feature.

Assume initially that the first hydraulic section 32 is in the stationary mode of the hitch 12, in which the pressure in the supply conduit 40 is maintained at the relatively low level, e.g., 7 bar, set by the force of spring 69 in the pressure compensator valve 66. Now when the tractor operator manipulates the human interface to raise the hitch 12, the controller 68 actuates the primary pilot valve 62 into the second state connecting the supply conduit 40 to the pilot port 45 of the directional control valve 42. The relatively low supply conduit pressure, however, may not be sufficient to move the valve spool 47.

The self-priming feature conveys the pressure that is being applied to the pilot port 45 to an input of the shuttle valve 64. At this time the directional control valve 42 is in the illustrated lowering position which conveys a lower pressure from the return conduit 44 through the load sense port 48 to the other shuttle valve input. Thus the supply conduit pressure applied to the pilot port 45 is passed by the shuttle valve 64 to the spring side of the pressure compensator valve 66. Therefore, the pressure from the supply conduit 40 now is applied to both sides of the valve element 67 of the pressure compensator valve 66. The additional force provided by the spring 69 closes the pressure compensator valve 66, thereby allowing the pressure within the supply conduit 40 to increase. This increasing pressure is conveyed through the primary pilot valve 62 to the pilot port 45 of the directional control valve 42 and eventually reaches a level that is sufficient to move the spool 47 in that latter valve into the desired position.

Therefore, the hydraulic section 32 enables the pressure in the supply conduit to increase from the relatively low standby pressure, when then hitch 12 is stationary, to a greater level that is sufficient to move the directional control valve spool 47 in to the position commanded by the controller 68.

Figure 3:
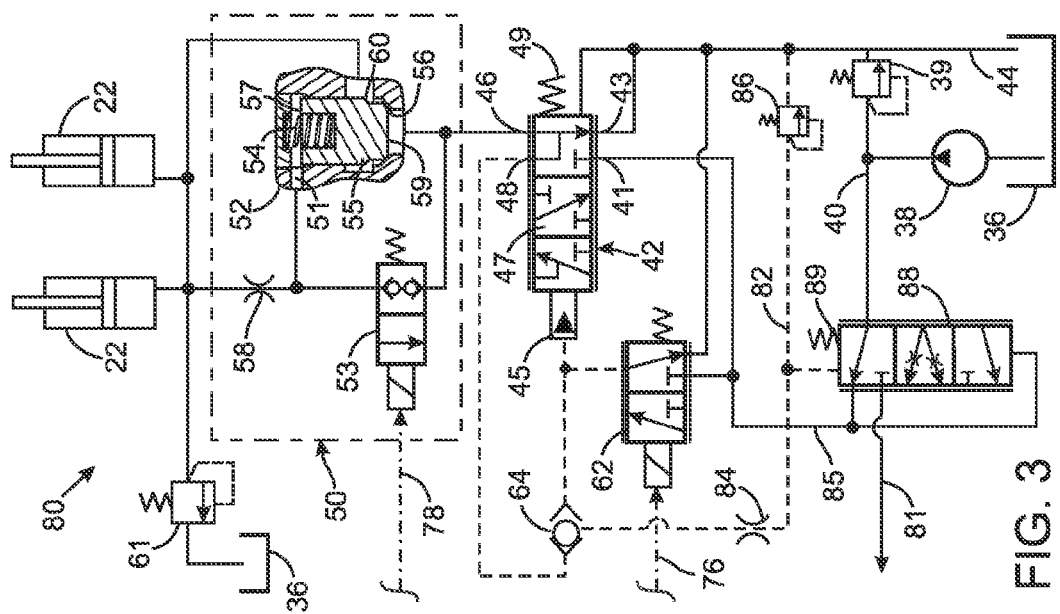
FIG. 3 illustrates a second hydraulic section for operating the hitch.

FIG. 3 depicts a second hydraulic section 80 for the control system 30. This hydraulic section has many of the same components as the first hydraulic section 32 in FIG. 2 and those components have been assigned identical reference numerals. The primary difference between those hydraulic sections relates to the load sense circuit and the pressure compensation valve, which enable another hydraulic function, in addition to the hitch 12, to be powered by pressurized fluid from the pump 38. That other hydraulic function is connected to a secondary supply conduit 81.

The load sense conduit 82 is coupled to the outlet of the shuttle valve 64 by a damping orifice 84. A pressure relief valve 86 couples the load sense conduit 82 to the tank return conduit 44.

Pressure in the load sense conduit 82 is applied to one end of a three position pressure compensation valve 88 which end also is biased by a spring 89. The pressure compensation valve 88 proportionally controls the flow of fluid from the supply conduit 40 to both the secondary supply conduit 81 and a hitch supply conduit 85. The supply conduit 40 is not directly connected to the supply port 41 of the directional control valve 42, instead that port is directly connected to the hitch supply conduit 85. The hitch supply conduit 85 also is connected to the first port of the primary pilot valve 62.

The second hydraulic section 80 generally functions in the same manner as the first hydraulic section 32 described previously. Nevertheless, the pressure in the load sense conduit 82 controls the pressure in the hitch supply conduit 85 so that operation of the hitch 12 has priority over the other hydraulic function connected to the secondary supply conduit 81. When the hitch function is not consuming fluid from the pump the pressure in the hitch supply conduit 85 is greater than the load sense pressure in conduit 82. This results in a pressure differential across the pressure compensation valve 88 which places that valve in a position where the outlet flow from the pump 38 is primarily made available to the secondary supply conduit 81.

When the hitch 12 requires fluid to operate the hydraulic cylinders 22 and the primary pilot valve 62 opens, the pressure in the load sense conduit 82 is equal to pressure in the hitch supply conduit 85. Now the additional force provided by the spring 89 moves the pressure compensation valve 88 into a position in which a greater amount of fluid from the pump 38 is made available to the hitch function. The pressure compensation valve 88 apportions the total pump output between the hydraulic functions to ensure that the flow demands of the hitch operation are satisfied.

The pressure relief valve 86 connected to the load sense conduit 82 can be set to open at a lower pressure than the primary pressure relief valve 39 connected to the supply conduit 40. This enables a lower relief pressure threshold to be defined for the hitch function than the relief pressure threshold for the other hydraulic function connected to the secondary supply conduit 81.

Figure 4:
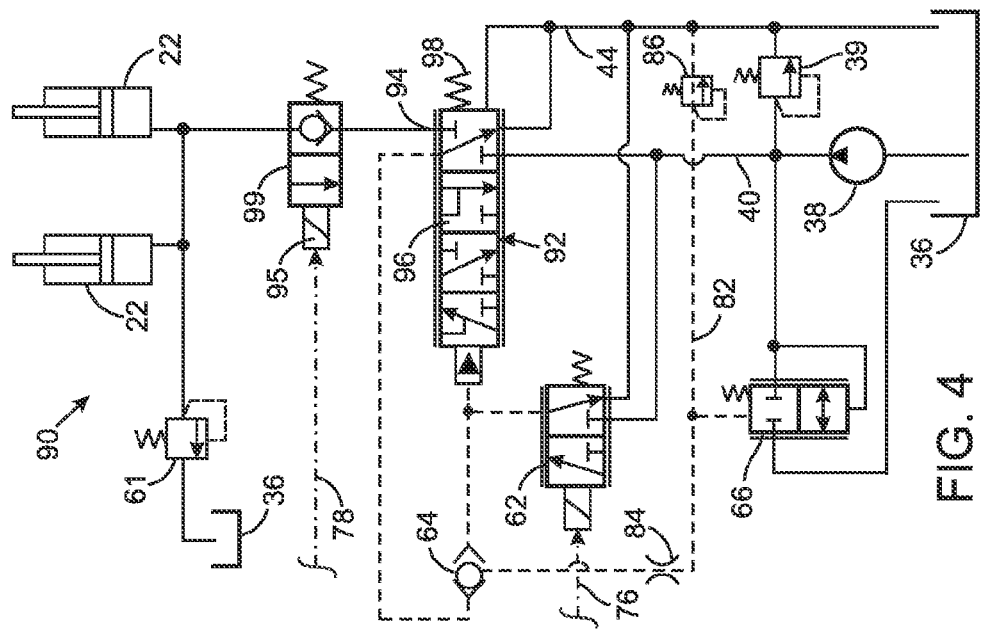
FIG. 4 shows a third hydraulic section for operating the hitch.

A third hydraulic section 90 for the control system 30 is illustrated in FIG. 4. The components of this hydraulic section 90 that are the same as those described previously with respect to the first and second hydraulic sections 32 and 80 have been assigned identical reference numerals. One difference regarding the third hydraulic section 90 is that the directional control valve 92 is a four-position valve with a fourth position in which the workport is disconnected from both the supply conduit 40 and the return conduit 44. This fourth position is at one extreme end of the travel of the valve spool 96 into which the spring 98 biases the spool. In the deactivated state of the pilot operated directional control valve 92, i.e., when the primary pilot valve 62 is de-energized, the spring 98 forces the valve spool 96 into the closed, fourth position.

This provides an additional margin of safety in the event that the selective check valve 50 sticks open, in which event a three-position directional control valve 42, biased into the lowering position, would allow the hitch 12 to drop rapidly. The four-position directional control valve 92 defaults to the closed, fourth position that blocks fluid flow out of the hydraulic cylinders 22, except for a relatively small leakage flow.

The third position used to lower the three-point hitch is between the second and fourth positions both of which are closed positions of the valve. The first position of the directional control valve 92 is used to raise the three-point hitch 12. The four-position directional control valve 92 may be used in place of the three-position directional control valves in the embodiments shown in FIGS. 2 and 3.

The third hydraulic section 90 also has a selective check valve 99 that is operated directly by an electrical signal applied to control port 95, which may be part of a solenoid. It should also be understood that the pilot operated selective check valve 50 and the electrohydraulic selective check valve 99 may be used in place of one another in the three hydraulic sections described herein.

Although the directional control valve 92 is normally biased into a closed position, a selective check valve 99 still is provided in order to ensure that the hydraulic circuit has low leakage. This enables the three-point hitch 12 to be maintained in a fixed position for a prolonged time when the directional control valve is closed. In this operating mode, the selective check valve 99 prevents fluid flow from the hydraulic cylinders 22 to the directional control valve 92 where over time enough leak can occur thereby lowering the hitch. A functional difference of the four-position directional control valve 92 is that to lower the hitch 12, the controller 68 must actuate the primary pilot valve 62 to move the directional control spool 96 into the third position which couples the tank return conduit 44 to the workport 94. After that valve spool 96 has been properly positioned to meter the fluid at the rate desired by the operator, the controller 68 opens the selective check valve 99.

The raising operation of the hitch 12 is accomplished with the third hydraulic section 90 in the same manner as described previously for the first hydraulic section 32. As with the other embodiments, the third hydraulic section incorporates the self priming feature described previously.

Figure 5:
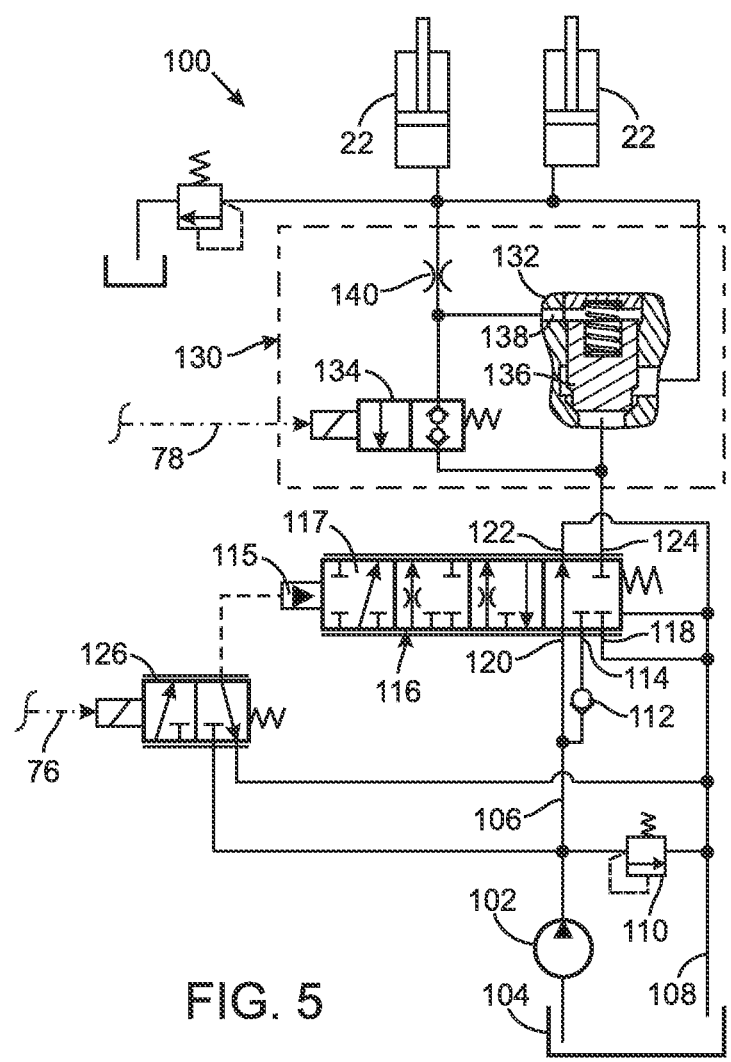
FIG. 5 illustrates a fourth hydraulic section for operating the hitch.

With reference to FIG. 5, a fourth hydraulic section 100 includes a pump 102 that draws fluid from a tank 104 and sends that fluid under pressure into a supply conduit 106. A primary pressure relief valve 110 is provided to relieve excessively high pressure that occurs in the supply conduit 106 to a return conduit 108 leading to the tank. The supply conduit 106 is coupled by a load holding check valve 112 to a supply port 114 of a directional control valve 116, that also has a tank port 118 which is connected to the return conduit 108. The supply conduit 106 also is connected directly to a bypass inlet port 120 and the directional control valve has a bypass outlet port 122 directly connected to the return conduit 108. The directional control valve 116 includes a workport 124.

The directional control valve 116 is an open center, four-position spool valve which is pilot operated by a proportional primary pilot valve 126 that is electrically activated by the signal on the first conductor 76 from the controller 68. Alternatively, the directional control valve can be operated by a solenoid arrangement. The directional control valve 116 has a first position in which the supply port 114 is connected directly to the workport 124. In a second position, the workport is disconnected from both the pump 102 and the tank 104, and an open center path with an orifice couples the bypass inlet port 120 to the bypass outlet port 122. The orifice maintains a pressure level in the supply conduit 106 that is sufficient to move the spool 117 in response to operation of the primary pilot valve 126 without requiring the self-priming feature described for previous embodiments. The directional control valve 116 has a third position in which the workport 124 is connected to the tank return conduit 108, and the orifice in the open center path couples the bypass inlet port 120 to the bypass outlet port 122. In the fourth position of the directional control valve, the workport 124 is disconnected from both the pump 102 and the tank 104, and the open center path directly connects the bypass inlet port 120 to the bypass outlet port 122. The second position is between the first and third positions, and the third position is between the second and fourth positions. The directional control valve is biased into the fourth position by a spring.

The workport 124 is coupled by a selective check valve 130 to the head chambers of the two single acting hydraulic cylinders 22 on the three-point hitch 12. The selective check valve 130 has a first state which allows fluid to flow only from the workport 124 to the hydraulic cylinders 22. In a second state, the selective check valve 130 permits fluid to flow from the hydraulic cylinders 22 to the workport 124.

In the embodiment in FIG. 5, the selective check valve 130 is identical to valve 52 in FIG. 2 that was described previously. In particular selective check valve 130 is a pilot valve assembly that comprises a low leakage, poppet check valve 132 operated by a secondary pilot valve 134. The state of the selective check valve 130 is controlled by pressures applied to opposite ends of the poppet 136. Pressure from the head chambers of the hydraulic cylinders 22 is applied through a fixed orifice 140 to a control port 138. The secondary pilot valve 134 opens and closes a path between the control port 138 and the workport 124 of the directional control valve 116, in response to the electric signal in the second conductor 78 from the controller 68.

When the primary pilot valve 126 is deenergized the pilot port 115 of the directional control valve 116 is connected to the return conduit 108 and receives relatively low pressure. Thus the spring forces the spool 117 of the directional control valve into the fourth position, as shown in FIG. 5, in which the workport 124 is disconnected from both the supply and return conduits 106 and 108. In this fourth position, the pressure in the supply conduit 106 is relieved to the return conduit by the connection of the bypass inlet port 120 to the bypass outlet port 122. The first position denote at the opposite end of the illustrated valve is used to raise the three-point hitch 12 by conveying fluid from the supply port 114 to the workport 124. In the second position, the hitch hydraulic cylinders 22 are held in place by disconnecting the workport 124 from both the supply and return conduits 106 and 108 and the supply conduit pressure is relieved through an orifice into the return conduit 108. In all the above states, the secondary pilot valve 134 is held in the closed, deenergized, state so that the poppet check valve 132, and thus the selective check valve 132, opens only in the first position of the directional control valve 116, when the workport pressure from the supply conduit 106 exceeds the pressure in the hydraulic cylinders 22.

The third position is employed to lower the hitch 12 by connecting the workport 124 to the return conduit 108 and relieving the supply conduit pressure through an orifice into the return conduit 108. After the directional control valve 116 has been placed in the proper metering position, the selective check valve 130 is opened by the controller 68 energizing the secondary pilot valve 134 into the open state that provides a path between the control port 138 of the poppet check valve 132 and the workport 124 of the directional control valve. This applies a relatively low pressure from the return conduit 44 to both ends 57 and 59 of the poppet 55 which enables the relatively high pressure from the cylinder that also is applied to the lower end of the poppet to force the poppet check valve 132 open.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A system for operating a hydraulic cylinder by selectively controlling flow of fluid between a chamber of the hydraulic cylinder and each of a pump and a tank, the system comprising:
a directional control valve including a workport, and a spool that has a first position in which the workport is connected to the pump, a second position in which the workport is disconnected from both the pump and the tank, and a third position in which the workport is connected to the tank, wherein the second position is between the first and third positions;
a selective check valve operably connected to control fluid flow between the workport and the chamber of the hydraulic cylinder, and having a first state in which fluid can flow only from the workport toward the chamber and a second state in which fluid can flow from the chamber to the workport, wherein the selective check valve changes states in response to a control signal applied to a control port;
the directional control valve having a fourth position in which the workport is disconnected from both the pump and the tank, wherein the third position is between the second and fourth positions, and a spring biases the directional control valve into the fourth position; and
the directional control valve in the second, third, and fourth position provides a path between the pump and the tank.

2. The system as recited in claim 1 wherein the selective check valve is operated by pressure applied to the control port.

3. The system as recited in claim 2 further comprising a secondary pilot valve that is electrically operated to open and close a path between the workport and the control port of the selective check valve.

4. The system as recited in claim 2 further comprising:
a secondary pilot valve that is electrically operated to open and close a path between the workport and the control port, in order to switch the selective check valve between the first state and the second state; and
an orifice coupling the control port to the chamber of the hydraulic cylinder.

5. The system as recited in claim 1:
wherein the directional control valve is pilot operated by pressure applied to a pilot port; and
further comprising primary pilot valve that is electrically operated to connect the pilot port of the directional control valve alternately to an outlet of the pump and to the tank.

6. The system as recited in claim 5 wherein the directional control valve proportionally controls fluid flow, and the primary pilot valve proportionally controls fluid flow.

7. The system as recited in claim 5 further comprising:
a load sense logic element that selects a greater of pressure at the workport and pressure at the pilot port of the directional control valve, thereby producing a load sense pressure; and
a pressure compensator valve that, in response to a difference between the load sense pressure and pressure from the outlet of the pump, selectively provides a path through which fluid flows from the outlet to the tank.

8. The system as recited in claim 7 wherein the pressure compensator valve is biased by a spring, wherein the path is opened when pressure at the outlet of the pump exceeds the load sense pressure by an amount defined by a force provided by the spring.

9. The system as recited in claim 7 further comprising an orifice directly connected between the load sense logic element and the pressure compensator valve; and a pressure relief valve that limits the load sense pressure which is applied to the pressure compensator valve to less than a predefined level.

10. The system as recited in claim 5 further comprising:
a load sense logic element that selects a greater of pressure at the workport and pressure at the pilot port of the directional control valve, thereby producing a load sense pressure; and
a pressure compensator valve that dynamically apportions fluid from the pump between each of a hitch supply conduit connected to the directional control valve and a secondary supply conduit, in response to a difference between the load sense pressure and in the hitch supply conduit.

11. A system for operating a single-acting hydraulic cylinder by selectively controlling flow of fluid between a chamber of the hydraulic cylinder and each of a pump and a tank, the system comprising:
a directional control valve, with a workport, has a first position in which the workport is connected to receive fluid from the pump, a second position in which the workport is disconnected from both the pump and the tank, and a third position in which the workport is connected to the tank, wherein the second position is between the first and third positions, wherein the directional control valve is pilot operated by pressure applied to a pilot port;
a primary pilot valve that is electrically operated to apply pressure alternately from an outlet of the pump and from the tank to the pilot port of the directional control valve;
a selective check valve operably connected to control fluid flow between the workport and the chamber of the hydraulic cylinder, and having a first state in which fluid can flow only from the workport toward the chamber and a second state in which fluid can flow from the chamber to the workport, wherein the selective check valve is operated by a control signal applied to a control port;

a load sense logic element that selects a greater of pressure at the workport and pressure at the pilot port of the directional control valve, thereby producing a load sense pressure;

a pressure compensator valve that, in response to a difference between the load sense pressure and pressure received from the outlet of the pump, selectively controls fluid flow from the pump to the directional control valve; and the directional control valve having a fourth position in which the workport is disconnected from both the pump and the tank, wherein the third position is between the second and fourth positions, and a spring biases the directional control valve into the fourth position.

12. The system as recited in claim 11 wherein the directional control valve in the second, third, and fourth position provides a path between the pump and the tank.

13. The system as recited in claim 11 wherein the directional control valve comprises a spool valve.

14. The system as recited in claim 11 wherein the directional control valve proportionally controls fluid flow, and the primary pilot valve proportionally controls fluid flow.

15. The system as recited in claim 11 wherein the pressure compensator valve responds to the difference by selectively controlling a path through which fluid flows from the outlet of the pump to the tank.

16. The system as recited in claim 15 wherein the pressure compensator valve is biased by a spring, and opens when the pressure received from the outlet of the pump exceeds the load sense pressure by an amount defined by a force provided by the spring.

17. The system as recited in claim 11 wherein the pressure compensator valve increases fluid flow from the pump to the directional control valve in proportion to an amount that the load sense pressure exceeds pressure received from the outlet of the pump.

18. The system as recited in claim 11 further comprising an orifice between the load sense logic element and the pressure compensator valve; and a pressure relief valve that limits the load sense pressure which is applied to the pressure compensator valve to less than a predefined level.

19. A system for operating a single-acting hydraulic cylinder by selectively controlling flow of fluid between a chamber of the hydraulic cylinder and each of a pump and a tank, the system comprising:

a directional control valve, with a workport, has a first position in which the workport is connected to receive fluid from the pump, a second position in which the workport is disconnected from both the pump and the tank, and a third position in which the workport is connected to the tank, wherein the second position is between the first and third positions, wherein the directional control valve is pilot operated by pressure applied to a pilot port;

a primary pilot valve that is electrically operated to apply pressure alternately from an outlet of the pump and from the tank to the pilot port of the directional control valve;

a selective check valve operably connected to control fluid flow between the workport and the chamber of the hydraulic cylinder, and having a first state in which fluid can flow only from the workport toward the chamber and a second state in which fluid can flow from the chamber to the workport, wherein selective check valve is operated by pressure applied to a control port;

a load sense logic element that selects a greater of pressure at the workport and pressure at the pilot port of the directional control valve, thereby producing a load sense pressure;

a pressure compensator valve that, in response to a difference between the load sense pressure and pressure received from the outlet of the pump, selectively controls fluid flow from the pump to the directional control valve; and a secondary pilot valve that is electrically operated to open and close a path between the control port of the selective check valve and the workport.

20. The system as recited in claim 19 wherein the secondary pilot valve is electrically operated to open and close a path between the control port and the workport, in order to switch the selective check valve between the first state and the second state; and an orifice connecting the control port to the chamber of the hydraulic cylinder.

* * * * *